April 15, 1958     R. S. OTTO     2,830,818
PLASTIC FEATHER AND METHOD FOR MAKING SAME
Filed Oct. 5, 1954     2 Sheets-Sheet 1
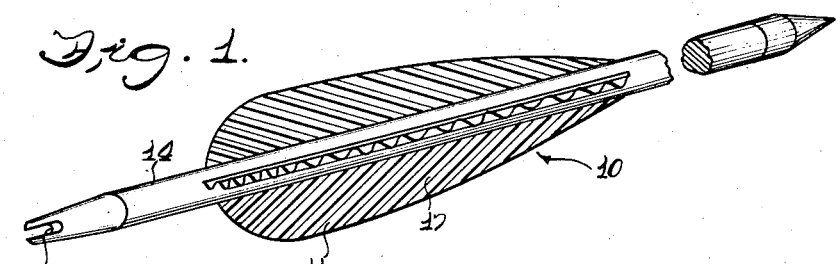
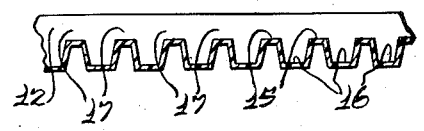
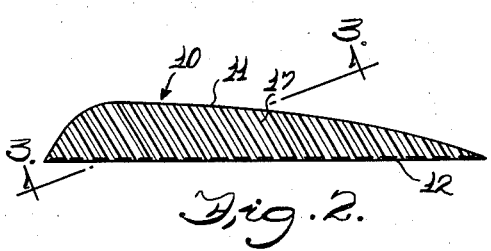
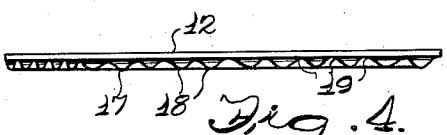
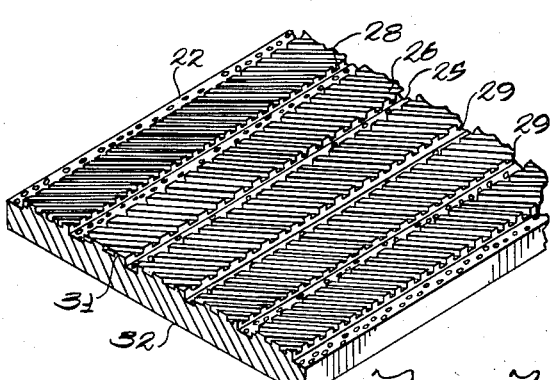
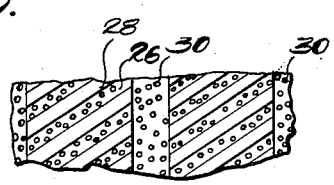
Inventor
Robert S. Otto April 15, 1958   R. S. OTTO   2,830,818
PLASTIC FEATHER AND METHOD FOR MAKING SAME
Filed Oct. 5, 1954   2 Sheets-Sheet 2

Inventor
Robert S. Otto
Attorney

United States Patent Office 2,830,818
Patented Apr. 15, 1958

2,830,818

PLASTIC FEATHER AND METHOD FOR MAKING SAME

Robert S. Otto, Evanston, Ill., assignor of one-half to Jack E. Dominik

Application October 5, 1954, Serial No. 460,491

4 Claims. (Cl. 273—106.5)

The present invention relates to archery equipment, and in particular to a plastic feather for use on arrows. The invention contemplates both a unique plastic feather, as well as a new method for making plastic feathers.

The use of the bow and arrow by man is as old as recorded history itself. Development in this art has been slow. Indeed, it has only been in the last few years that new materials have entered into the field. But despite the advent of glass, plastic, and metal as materials for the bows and arrows, the turkey feather is still fletched to today's arrow. Some attempts have been made to develop a plastic feather, but none have met any widespread commercial success. Their shortcomings have been due to being either too stiff, brittle, difficult to fletch, inaccurate in flight, or dangerous for the archer to use.

With the foregoing in mind, it is the general object of the present invention to furnish the archer with a plastic feather which is the full operational equivalent of a turkey feather.

An additional object of the invention is to provide a method for manufacturing plastic feathers at a cost which will make them competitive with turkey feathers.

Another object of the invention is to make a durable plastic feather which flexes readily in use and yet retains its true aerodynamic characteristics in flight.

Still another object of the present invention is to provide the archer with an outdoor feather which will withstand rain and moisture without becoming unserviceable.

Further objects and advantages of the invention will become apparent as the following description proceeds, taken in connection with the accompanying drawings in which:

Figure 1 illustrates in an enlarged perspective view the employment of a plastic feather illustrating the present invention on a conventional archer's arrow.

Fig. 2 illustrates in plan view a plastic feather exemplary of the present invention.

Fig. 3 is an enlarged sectional view of the plastic feather taken along section 3—3 as indicated in Fig. 2.

Fig. 4 is a top view of a plastic feather shown in the foregoing figures.

Fig. 5 is a cutaway plan view of a sheet of plastic formed for cutting into feathers in accordance with a method exemplary of the present invention.

Fig. 6 is a partial plan view, reduced in size, of a die employed for cutting to shape plastic feathers from the sheets of plastic illustrated in Fig. 5.

Fig. 7 is a perspective cutaway view of a die used for forming the plastic sheets such as illustrated in Fig. 5.

Fig. 8 is an enlarged partial plan view of the die shown in Fig. 7 illustrating the breathing pores in the die.

Figure 9:
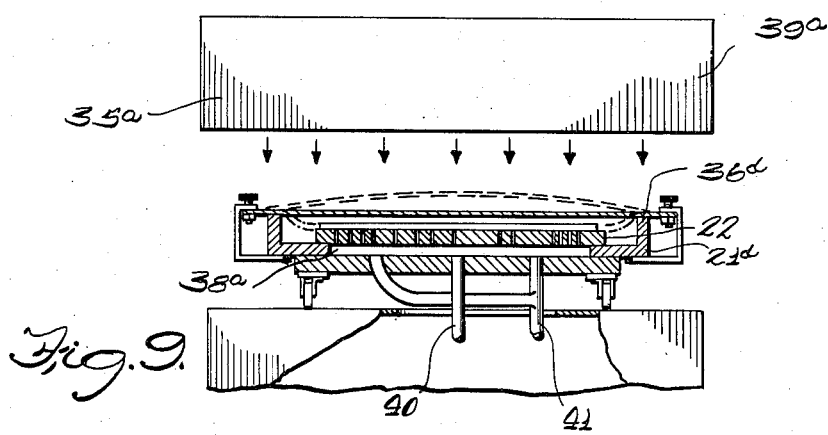
Fig. 9 illustrates means for employing one form of a vacuum-forming method for preparing the plastic feather sheets such as illustrated in Fig. 5.

The design of the feather itself has been developed to functionally simulate that of a turkey feather, and yet permit of inexpensive and mass production manufacturing techniques. The method of manufacture, at the same time, has been developed to augment the advantages achieved by the feather design and furnish further desirable qualities in the product attributable to the method of manufacture itself.

One of the problems hitherto unsolved has been to provide for satisfactorily fletching (usually gluing) any proposed plastic feather to the arrow. The present design of feather provides adequately for fletching which is in many respects superior to that of a turkey feather. As the description proceeds the means for fletching and its superior qualities will become evident.

A particular design of plastic feather 10 illustrating the present invention is shown in Figs. 1, 2, 3, and 4. It will be noted that the plastic feather 10 contemplates a vane 11 terminating at its base in a base runner 12 which is used to fletch the plastic feather 10 to the arrow 14. The base runner 12, it will be noted, is offset from the vane 11 and flat on the bottom. A comparison with a turkey feather will show that the quill is ground and cut for a fletching base which is also offset from the vane. It will be appreciated that various silhouettes of the plastic feather may be employed in accordance with the dictates of the archer and the use to which the arrow will be put.

The vane of a plastic feather illustrating the invention is best illustrated in Fig. 3. There it will be seen that the spines 17 of the feather are made up of alternating lands 15 and grooves 16. A modification of this construction is illustrated in Fig. 4 where instead of the pronounced lands and grooves, an undulating or rippled surface with peaks 18 and valleys 19 may be employed. The precise configuration of the spines in the plastic feather will be to a considerable extent determined by the method of manufacture as will be more fully detailed as this description proceeds.

The rake or angle with which the spines 17 intersect the longitudinal axis of the arrow 14 is substantially the same as the angle of intersection with the base runner 12. Excellent results have been achieved when this angle is 30°, but variations from that angle are contemplated by the present invention.

At the bottom of the feather 10 a base runner or footing 12 is provided to furnish a fletching surface for each feather. The base runner extends to one side of the feather body itself much as is the case with a turkey feather intended for use with an archer's arrow. In actually mounting the feather 10 to an arrow 14 the base runner 12 may be canted slightly along the axis of the arrow 14 in order to impart a twisting action to the arrow in flight. This is a matter of discretion with the arrow maker, and serves to illustrate the flexibility in application of the plastic feather.

The materials used in the fabrication of the feather are dictated not only by the quality and charcteristics of the feather, but also by the method of manufacture. Indeed, it has been found desirable to strike a balance between the product and its method of manufacture. The invention also contemplates the solution of this problem.

It has been found that a high grade of plastic feather can be prepared by vacuum casting laminated thermoplastic sheets of polyethylene and polyvinylchloride. Several reasons underlie the choice of these materials. The vinyls become limp at high temperatures and brittle when cold. Polyethylene has excellent thermal properties, but cannot be satisfactorily fletched. By laminating the two materials with the vinyl forming the bottom of the base runner 12, a feather may be formed which is stronger, can be colored, and functions well at temperature extremes.

A pressure-sensitive cement, which may be pigmented to color the feathers in accordance with the wishes of the manufacturer, is used as a sandwich spread between the plies of the thermosetting materials. If it is desired to produce a plastic feather that curls slightly, as will a turkey feather, a one mil thickness sheet of polyvinylchloride is laminated with a five mil sheet of polyethylene. For a perfectly straight feather, the five mil sheet of polyethylene is used as the central section, and the one mil sheets of polyvinylchloride are used to veneer the exposed surfaces. To achieve greater flexibility the thickness of the center section or other sheets may be reduced.

Not only does this method of manufacture make possible the pigmenting of the feathers to a desired color, but by using the three-ply it is possible to have the feathers display different colors on different sides. In addition techniques are available to metallize with various metallic substances the external portion of the feather.

The foregoing unique method of laminating the material used in manufacturing the plastic feather described above is not at all suggested by the construction of the feather; nor is there any suggestion that master sheets for feather blanks may be vacuum cast from the laminated thermoplastic materials such as illustrated in Fig. 5. This method has the additional advantage of utilizing a relatively inexpensive mold, such as shown in Fig. 7.

In broad outline, the method of vacuum casting the feather blanks 20 such as illustrated in Fig. 5 first contemplates the preparation of a sheet of thermoplastic material into the proper size for casting. Although it has been found that very high quality plastic feathers may be prepared from laminated sheets of polyvinylchloride veneering a central sheet of polyethylene, it is possible to make the feather blanks 20 from a single sheet of any thermoplastic material which upon fabrication furnishes a feather soft enough to flex when passing the bow, and yet resilient enough to snap back to shape and guide the arrow in flight.

Figure 10:
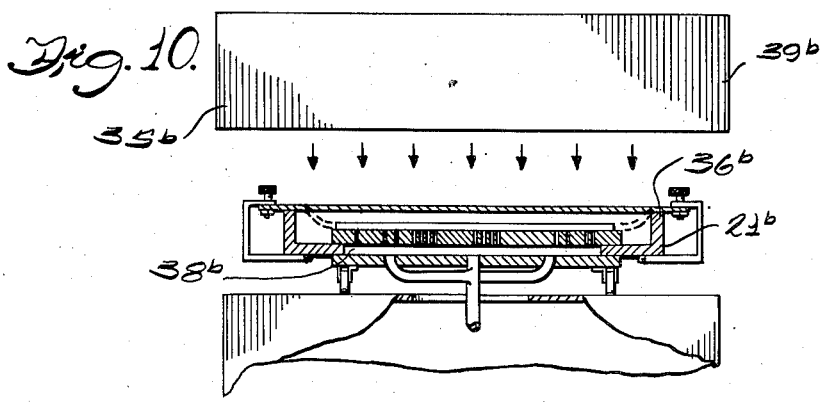
Fig. 10 is an alternative plastic forming machine for preparing the plastic feather sheet blanks such as illustrated in Fig. 5.
Figure 11:
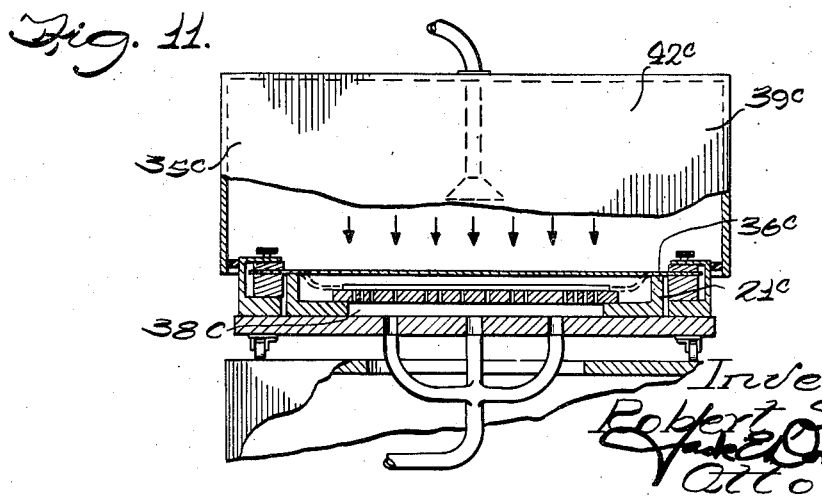
Fig. 11 is another alternative form of vacuum casting machine which may be used in preparing the plastic feather blanks such as illustrated in Fig. 5.

After the sheet has been prepared it is draped over the outer edges of the mold box 21 of a vacuum casting machine such as the various forms illustrated in Figs. 9, 10 and 11. The thermoplastic sheet is then heated to a plastic state by various techniques, and then quickly drawn over the feather blank die 22 such as illustrated in Fig. 7. After the plastic sheet blank chills on the cold mold 22 it is stripped from the mold and is then ready for cutting to the desired feather shape by a die 24 such as illustrated in Fig. 6.

In greater detail, the method for preparing plastic feathers illustrative of one aspect of the present invention contemplates the preparation of a mold 22 such as illustrated in Fig. 7. The mold 22, it will be seen, is prepared from a flat sheet of stock with a plurality of longitudinal base runner grooves 25 and feather-forming lands 26 and grooves 28. It is desirable to employ at least a 3° draft on all vertical edges to insure a ready stripping of the mold after the plastic sheet chills.

The base runner 12 of the feather 10 is formed against the vertical edge of the runner channel 25 of the mold. In this manner the runner is formed in its offset location with a slight cant of approximately 3°—the draft of the mold. This angularity of the offset runner tends to compensate for the round of the arrow back when fletching and leaves the feather in a radial plane which enhances the flight characteristics of the arrow.

In Fig. 8 a random scattering of a plurality of minute pores 30 is shown in a small enlarged plan view of the die 22. These pores 30 must be of sufficient size to permit the drawing of air through the mold from its upper molding surface 31 to the bottom or vacuum chamber 33 of the mold.

In operation the mold 22 is placed in the vacuum casting machines 35a, 35b, 35c illustrated respectively in Figs. 9, 10 and 11. The mold is surrounded by a mold box 21a, b, c which has upwardly extending edges 36a, b, c. Beneath the mold 22 in each of the illustrative vacuum casting machines 35a, b, c is a vacuum chamber 38a, 38b, 38c. A plastic sheet heater 39a, b, c is positioned above the plastic sheet for the purpose of rendering it thermoplastic prior to exhausting the vacuum chambers 38a, b, c beneath the mold 22 in order to drape the plastic sheet over the mold surface 31.

Various techniques may be employed in heating the plastic sheet and draping it over the mold for its shaping chill. In one instance, such as illustrated in Fig. 9, compressed air is pumped into the vacuum chamber 38a through the compressed air inlet 40 which bellies out the plastic sheet into the form illustrated by the dotted lines in Fig. 9. Then after the sheet has been rendered thermoplastic by the heater 39a, the compressed air source is shut off and a high vacuum applied to the vacuum pipe 41. In the method of casting illustrated in Fig. 10 only the vacuum is employed after the plastic sheet has been heated. In the casting process illustrated in Fig. 11, not only is a vacuum impressed upon the sheet from beneath the mold through the vacuum chamber 38c, but hot air under pressure is forced downwardly through the hot air pressure chamber 42c.

In each of the vacuum casting machines illustated in Figs. 9, 10 and 11, the mold is rollingly mounted on a track to provide for its insertion beneath the space heater 39a, b, c. Consequently the mold is readily removable from the space heater for stripping the formed plastic sheet blank 20 from the mold 22 after the chill has set the sheet.

It will be appreciated that various modifications in the means for holding the plastic sheet on the mold box, and effecting travel between the mold and the space heaters may be employed as mechanical conveniences to facilitate more rapid manufacture.

After the feather blanks 20 have been molded, they are cut preferably with a die 24 or any convenient knife edge to the predetermined silhouette desired by the manufacturer. It is important that the fletching base runner 12 be preserved as a surface for fletching the feather 10 to the arrow 14. With certain materials used in the manufacture of the blanks 20, the silhousette of the feather need not be formed prior to fletching, but a rectangular blank may be fletched to the arrow, and then the arrow twisted in a jig and the silhouette formed by cutting the blank with a hot wire much as the present method of finishing turkey feathers.

One of the reasons for laminating the feathers is to obtain a surface which will readily fletch to the arrow. Thus far the art has produced no cement which will satisfactorily bind the polyethylene to an arrow. It can be affixed to an arrow with a pressure sensitive cement, but this does not withstand the abuse to which an arrow feather is subjected. The vinyl surface, howevr, is readily bonded to the arrow.

The fletching is accomplished in a normal fletching jig. Various cements may be employed with the plastic feather. A cement known by the trade name of Plio-Bond has been found highly satisfactory with plastic feathers made in accordance with the foregoing description. This cement will secure the feather to arrows made of wood, glass, plastic, or aluminum. The feathers may be canted on the arrow. The shiny vinyl side of the two-piece laminate should be on the bottom of the runner.

Although the particular illustration of the present invention has been shown and described in some detail here, there is no intention to thereby limit the invention to the details of such illustration. On the contrary, the intention is to cover all modifications, alternative embodiments, usages and equivalents of the plastic feather and method for its manufacture as fall within the spirit and scope of the invention as expressed and defined in the specification and the appended claims.

I claim as my invention:

1. For use with an archer's arrow, a laminated plastic feather made of vinyl base sheets and polyetheylene sheets, and characterized by a plurality of spines in its vane portion, the spines sloping rearwardly intersecting the long axis of the feather at an arcute angle, and a fletching base integral with the feather body and offset with a flat under portion of the vinyl base sheet serving as a fletching surface for attachment to the arrow.

2. For use with an archer's arrow, a plastic feather comprising laminations of thin outer sheets of a vinyl base material, and a central sheet of polyethylene, the layers being of equal thickness and bonded by a pressure sensitive cement, the material being formed to present a base runner with the vinyl base surface facing downwardly.

3. A method for making a plastic feather for use with an archer's arrow comprising the steps of laminating sheets of vinyl base plastic and polyethylene, placing the laminated sheet vinyl base plastic side down above a mold characterized by a plurality of spine forming lands and grooves and longitudinal fletching base grooves having vertical surfaces to form the base runner portion of the feather, the mold having a plurality of minute pores and vacuum chamber sideboards, sealing the vacuum chamber by draping the laminated sheet over the mold sideboards, heating the laminated sheet to a plastic state, rapidly exhausting the air space between the laminated sheet and the mold by applying a vacuum to the bottom of the mold which is transmitted to the vacuum chamber through the mold pores, stripping the laminated sheet from the cold mold after the sheet has taken a set, and cutting its sections into the feather shapes desired using the vertical surface formed by the vertical surfaces of the longitudinal grooves as the base runner of the feather.

4. For use with an archer's arrow, a plastic feather having a unitary vane portion and a flecthing base portion, the vane portion having a plurality of undulations, the undulations being proportioned to define spines sloping rearwardly and intersecting the long axis of the feather at an acute angle, and the fletching base portions being integral with the vane portion and offset with a flat under portion to serve as a fletching surface for attachment to the arrow.

References Cited in the file of this patent

UNITED STATES PATENTS

| 1,748,200 | Barnhart | Feb. 25, 1930 |
| 1,842,540 | Cowdery | Jan. 26, 1932 |
| 2,345,112 | Grundel | Mar. 28, 1944 |
| 2,493,439 | Braund | Jan. 3, 1950 |
| 2,667,436 | Goepfert | Jan. 26, 1954 |

FOREIGN PATENTS

| 498,823 | Great Britain | Jan. 10, 1939 |
| 590,842 | Great Britain | July 30, 1947 |
| 628,041 | Great Britain | Aug. 22, 1949 |